United States Patent [19]
Fluck et al.

[11] Patent Number: 4,744,458
[45] Date of Patent: May 17, 1988

[54] CONVEYOR FOR ADVANCING WAFER-LIKE ARTICLES

[75] Inventors: René Fluck, Schleitheim; Paul Graf, Neuhausen am Rheinfall, both of Switzerland

[73] Assignee: Sig Schweizerische-Industrie Gesellschaft, Neuhausen am Rheinfall, Switzerland

[21] Appl. No.: 827,741

[22] Filed: Feb. 10, 1986

[30] Foreign Application Priority Data

Feb. 11, 1985 [CH] Switzerland ............ 607/85
Feb. 11, 1985 [CH] Switzerland ............ 608/85

[51] Int. Cl.⁴ .......................................... B65G 47/26
[52] U.S. Cl. ...................... 198/460; 198/462; 198/634; 198/751; 198/570; 414/330
[58] Field of Search .............. 198/425, 460, 462, 633, 198/634, 771, 751, 775, 766, 570; 414/330

[56] References Cited

U.S. PATENT DOCUMENTS

| | | | |
|---|---|---|---|
| 2,736,423 | 2/1956 | Beals | 198/634 |
| 4,082,176 | 4/1978 | Pommer | 198/425 |
| 4,354,589 | 10/1982 | Fluck | 198/419 |
| 4,462,522 | 7/1984 | Fluck | 198/766 |
| 4,611,704 | 9/1986 | Burgess | 198/771 |

FOREIGN PATENT DOCUMENTS

| | | | |
|---|---|---|---|
| 2243906 | 3/1974 | Fed. Rep. of Germany | |
| 367751 | 4/1963 | Switzerland | |
| 1356384 | 6/1974 | United Kingdom | 198/462 |
| 2112728 | 7/1983 | United Kingdom | 198/460 |

*Primary Examiner*—Joseph E. Valenza
*Attorney, Agent, or Firm*—Spencer & Frank

[57] ABSTRACT

A vibratory conveyor for advancing stacked wafer-like articles in an edgewise upstanding orientation includes a vibratory trough having a vibratory base portion of a width which is less than the width of the entire vibratory trough. The conveyor further has a non-vibratory, elongated base component situated adjacent the vibratory base portion and having a width which, together with the width of the vibratory base portion constitutes substantially the width of the entire vibratory trough. In response to an operational parameter of the vibratory conveyor, the articles are caused to be disengaged from the vibratory base portion and engaged solely by the non-vibratory base component, whereby conveyance of the articles is interrupted.

16 Claims, 4 Drawing Sheets

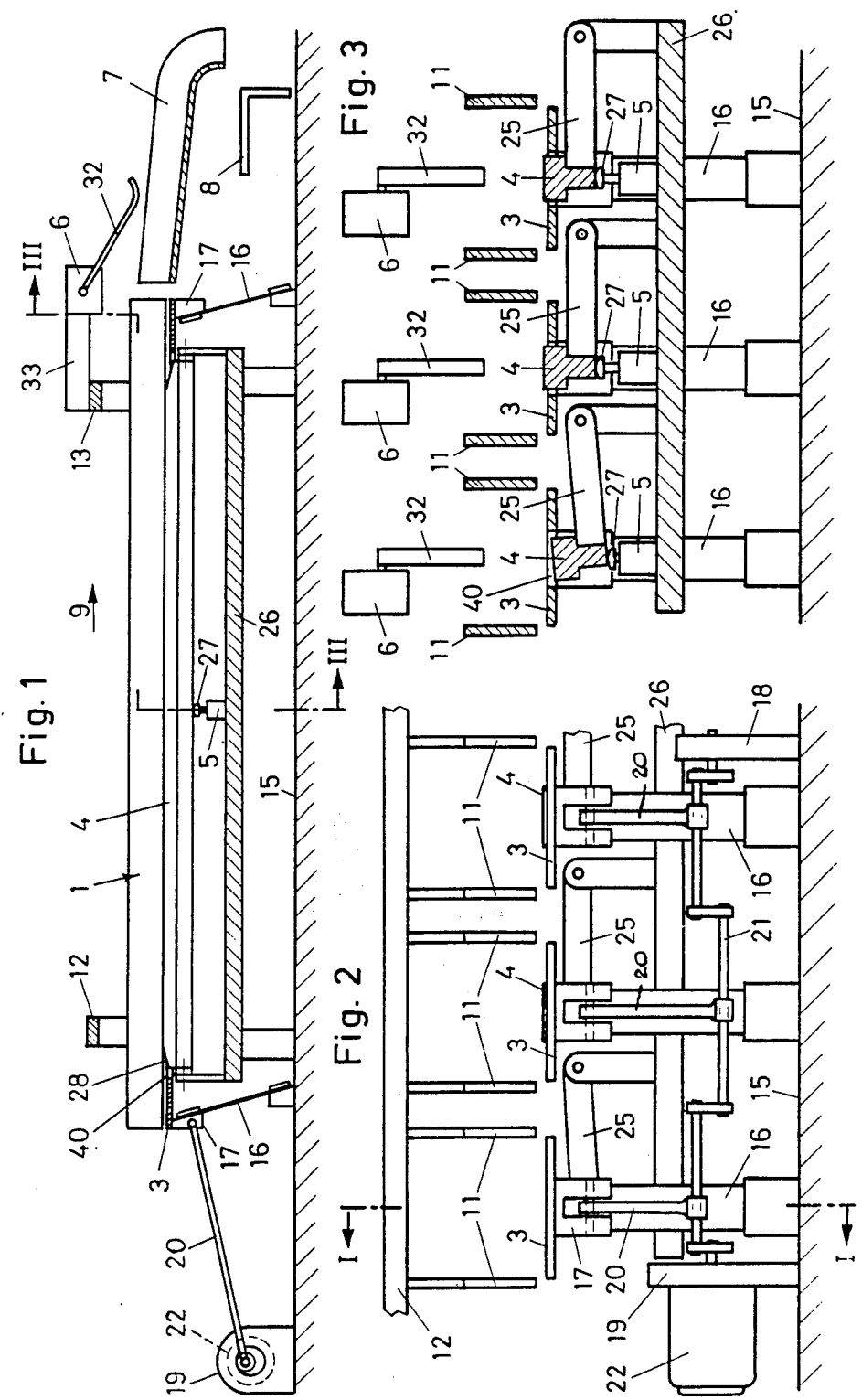

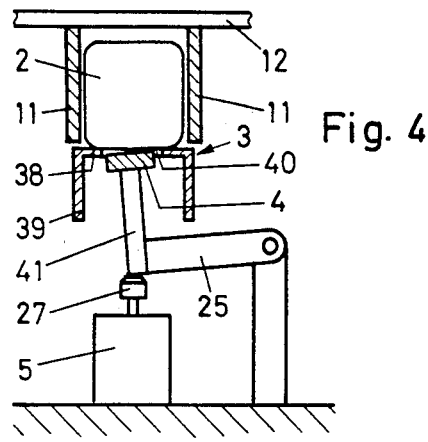
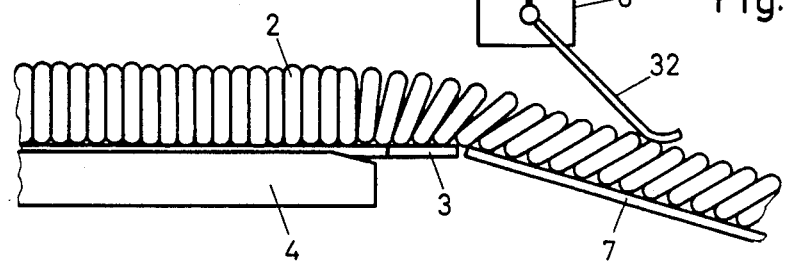
Fig. 4
Fig. 5
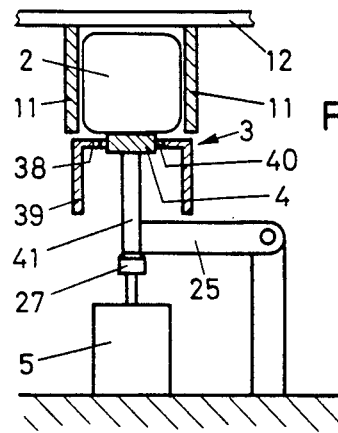
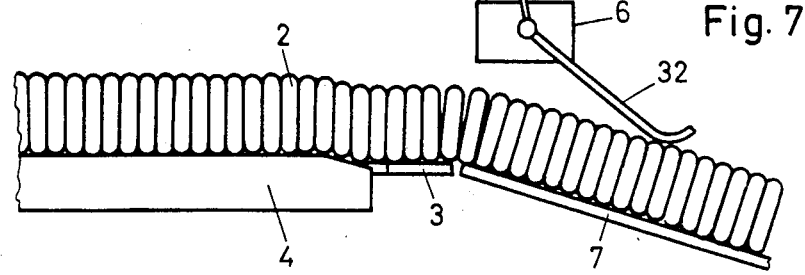
Fig. 6
Fig. 7

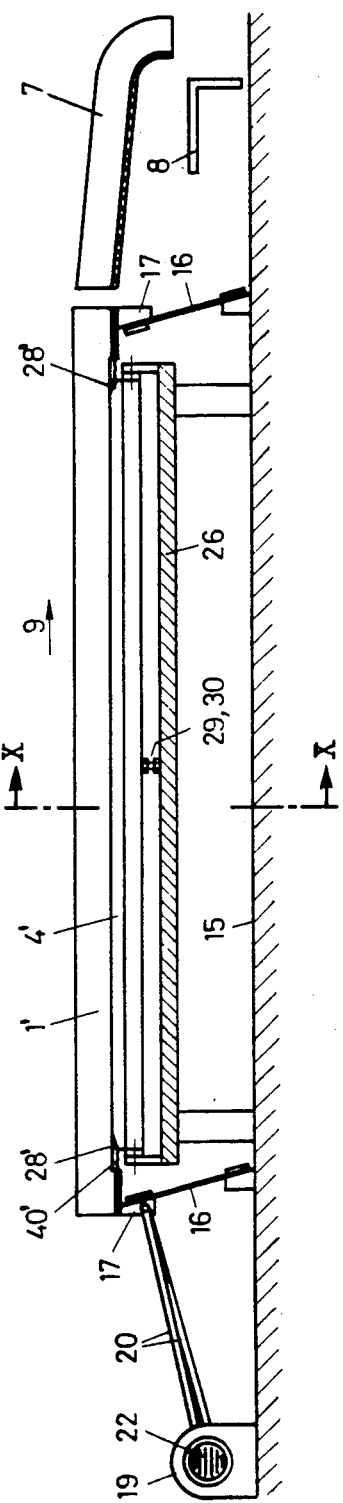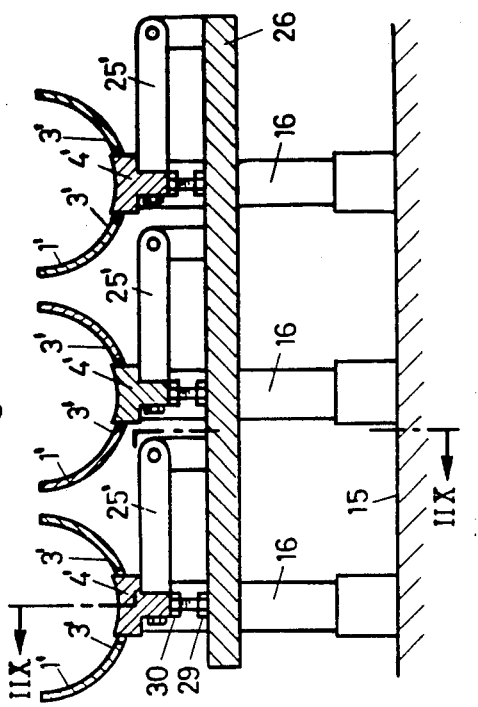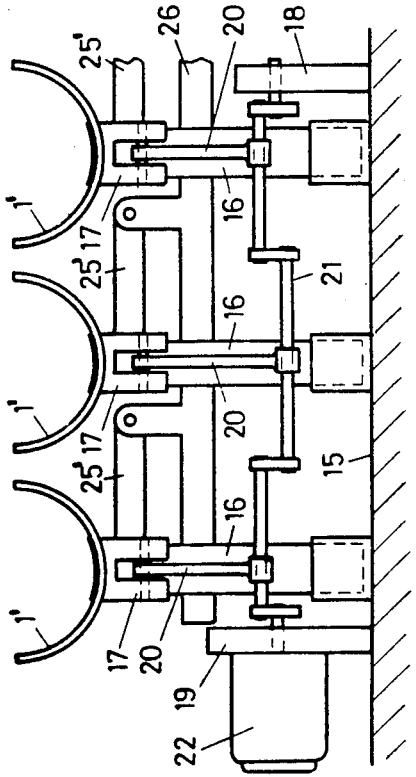

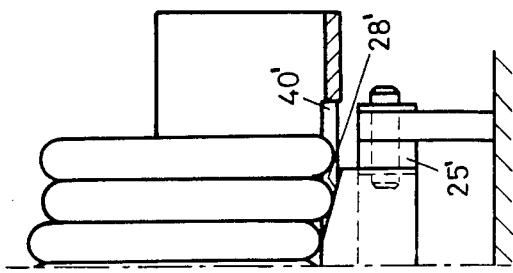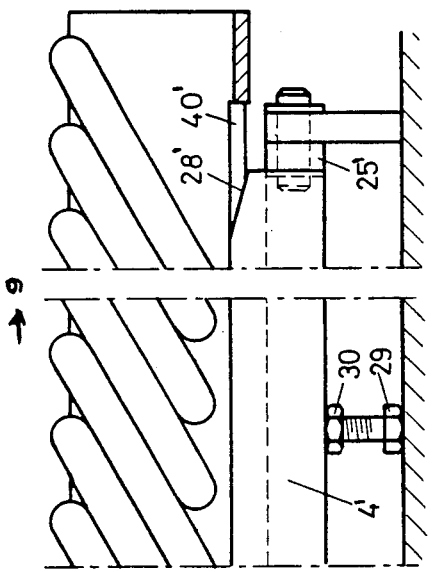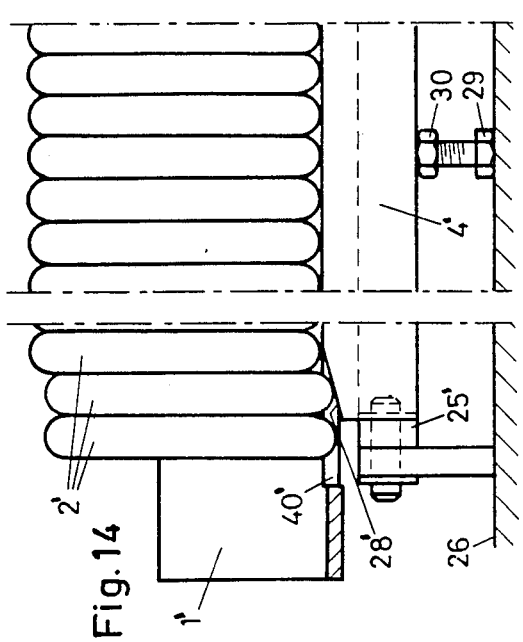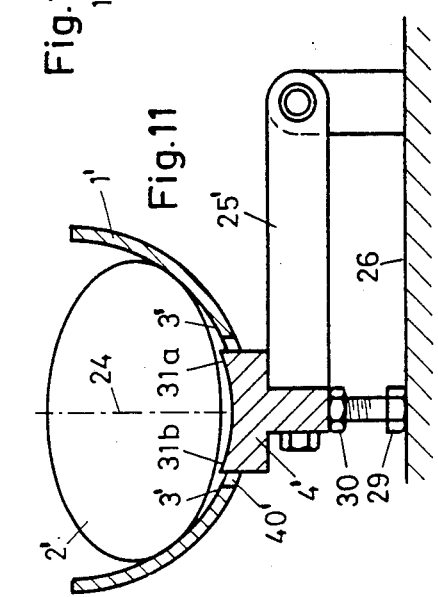

4,744,458

CONVEYOR FOR ADVANCING WAFER-LIKE ARTICLES

BACKGROUND OF THE INVENTION

This invention relates to a conveyor for advancing edgewise upstanding, mutually engaging stacked wafer-like articles by means of a vibratory trough conveyor assembly. An apparatus of this type is disclosed, for example, in Swiss Pat. No. 367,751. In this known construction, upstream of the vibratory trough conveyor these is arranged a conveyor belt and the conveyor trough, in turn, discharges the articles into a stationary channel from which the articles are removed in groups by a pusher (ejector) slide. A sensor, situated above the conveyor trough, interrupts the motion of the ejector slide in case the articles assume a pronounced oblique position (which is a result of an insufficient feed).

In the above-outlined known construction, the article stack is stationary in the vibrating conveyor trough when the ejector slide is in a de-energized state. This circumstance may lead to an abrasion of the edges of the articles—particularly if they are delicate confectionery items—and even may lead to a breakage thereof.

U.S. Pat. No. 4,462,522 discloses another conveyor apparatus of the above-outlined type. The construction described in this patent includes a plurality of side-by-side arranged vibratory troughs driven by a common crankshaft. The article advance is controlled by an energization and de-energization of the crankshaft drive. This arrangement causes an interruption of delivery of articles simultaneously in all the troughs. This is disadvangeous in case the different troughs deliver with different conveying rates which may occur, for example, in case an article accumulation is present only in one of the troughs.

German Offenlegungsschrift (published non-examined application) No. 2,243,906 discloses a sorting apparatus for wafer-like products, wherein the items are advanced by a conveyor belt formed of a plurality of parallel individual belts. To remove the pressure exerted by the articles against a barrier arranged at the downstream end of the conveyor belt, there is provided a rake which is pivotal about an axis oriented transversely to the direction of advance of the conveyor belt. The tines of the rake may be raised between the individual belts to thus brake the items at that location. Since this braking device is provided only locally, the remaining parts of the conveyor belt rub against the underside of the stationary items, leading to an undesired abrasion or to score marks.

SUMMARY OF THE INVENTION

It is an object of the invention to provide an improved conveyor of the above-outlined type wherein the conveying effect of selected troughs may be discontinued while a gentle handling of the articles is ensured.

This object and others to become apparent as the specification progresses, are accomplished by the invention, according to which, briefly stated, along at least one portion of the conveyor trough length a non-vibratory and non-travelling article supporting component is provided which forms part of the overall trough width and which is adapted to take over sole support of the articles from the vibrating surfaces.

In case the conveyor trough is filled with items, the latter are supported (backed up) solely by the stationary component, such as a rail and the conveying effect of the vibratory trough is thereby rendered ineffective without the need for de-energizing the vibratory drive. In case of several side-by-side arranged troughs having a common drive, there is consequently achieved a simple control of the individual troughs. The edges of the articles which contact the trough during conveyance are protected from wear and the articles themselves are protected from breakage.

According to a preferred embodiment of the invention, the rail is fixedly supported and it projects into the bottom area of the vibratory trough. If the articles are in their normal, substantially inclined position, they engage solely opposite wall portions of the vibratory trough and are thus advanced thereby, but if an accumulation of articles occurs and they thus assume a more vertical orientation, they are supported (engaged) at their lowermost part solely by the non-vibratory support rail. In this manner, the conveying effect of the vibratory trough is automatically regulated by the degree of fill.

According to another preferred embodiment of the invention, a drive arrangement is provided for raising or lowering the rail into or out of the bottom region of the vibratory conveyor trough. With this arrangement the conveying effect of the conveyor trough may be discontinued, for example, in case a "bottle neck" develops at the discharge end of the trough. This ensures a gentle handling of the items in the conveyor trough.

In contradistinction to the construction disclosed in the earlier-noted German Offenlegungsschrift No. 2,243,906, the rails provided according to the invention can extend practically along the entire length of the conveyor trough so that an effect of the vibrating article support trough portion on the item edges is eliminated for all practical purposes.

The arrangement according to the invention may find particularly advantageous application in coneyors which have a plurality of side-by-side arranged, commonly driven conveyor troughs, for the individual control and regulation of the conveying effect of the separate individual troughs.

BRIEF DESCRIPTION OF THE DRAWING

FIG. 1 is a schematic sectional side elevational view of a preferred embodiment of the invention, taken along line I—I of FIG. 2.

FIG. 2 is a front elevational view of the construction shown in FIG. 1.

FIG. 3 is a sectional view taken along line III—III of FIG. 1.

FIG. 4 is a schematic sectional elevational view of another preferred embodiment of the invention.

FIG. 5 is a schematic side elevational view of the construction shown in FIG. 4, depicting the same operational phase as that shown in FIG. 4.

FIG. 6 is a view similar to FIG. 4 but depicting the construction in another operational phase.

FIG. 7 is a view similar to FIG. 5 but depicting the structure in the same operational phase as in FIG. 6.

FIG. 8 is a sectional side elevational view of another preferred embodiment of the invention taken along line VIII—VIII of FIG. 10.

FIG. 9 is a front elevational view of the construction shown in FIG. 8.

FIG. 10 is a sectional view taken along line X—X of FIG. 8.

FIG. 11 is a sectional end elevational view of components of the structure shown in FIG. 10 depicted during conveyance of articles.

FIG. 12 is a longitudinal sectional view of the construction shown in FIG. 11 depicted during conveyance of articles.

FIG. 13 is a view similar to FIG. 11 shown during an interruption of article conveyance.

FIG. 14 is a view similar to FIG. 12 depicting the construction during an interruption of conveyance.

DESCRIPTION OF THE PREFERRED EMBODIMENTS

Turning to FIGS. 1, 2 and 3, the apparatus shown therein includes three side-by-side arranged vibratory conveyor troughs 1 adapted to advance flat, edgewise upright oriented, mutually contacting, stacked articles, such as confectionery wafers in a conveying direction 9 to separate stationary channels 7 (only one shown). From the lower end (discharge zone) of the channels 7 the articles are pushed away by a respective article grouping pusher slide 8. Each conveyor trough 1 has a vibratory base portion constituted by a vibrating article support plate 3 on which the articles are arranged in an edgewise standing orientation and two stationary lateral walls 11 which serve for the lateral guidance of the articles and which are secured to transverse carriers 12 and 13. The vibratory support plate 3 is mounted, at opposite ends, on a stationary machine frame 15 by means of two leaf springs 16 secured to the plate 3 by means of respective support blocks 17. To each frontal (upstream) support block 17 there is articulated a bar 20, journalling, at its other end, in a common crankshaft 21 rotated by a motor 22. The three bars 20 of the three conveyor troughs 1 are driven in synchronism, yet in a phase shift, by the common crankshaft 21. The crankshaft 21 is rotatably supported in bearing plates 18 and 19 attached to the machine frame 15. This multiple construction results in a superior balancing which could be obtained only with great difficulty in case the conveyor troughs are driven individually.

The support plate 3 of each conveyor trough 1 has a centrally extending rectangular opening 40 which is provided throughout the greater part of the length of the support plate 3. Through the opening 40 there projects a non-vibratory base component constituted by a rail 4 which is mounted on pivotal levers 25 which, in turn, are pivotally supported on an intermediate carrier 26 connected with the machine frame 15. The respective rails 4 are each individually pivotal about an axis oriented parallel to the longitudinal direction of the conveyor troughs 1. In this manner, each rail 4 may be lifted parallel to the longitudinal direction of the trough 1. In its upper position the rail 4 projects beyond the plate 3 as shown for the two right-hand plates 3 in FIGS. 2 and 3.

Conceivably, an article accumulation may occur but in a sole conveyor trough 1, in which case then the rail 4 of only that conveyor trough 1 is lifted.

A solenoid 5 is arranged centrally underneath each rail 4 for lifting the same. Each solenoid 5 is secured to an intermediate carrier 26 and has an armature 27 cooperating with an underface of the associated rail 4. In order to make possible slight displacements of the items in the conveying direction 9 without risks of damages even in the raised position of the rail 4, the latter has chamfered portions 28 at both ends, so that at the ends the rail 4, in its raised state, does not project beyond the plate 3.

For controlling the solenoid 5, a sensor 6 scans, with a sensor arm 32, the upper edge of the articles in the channel 7. Sensor 6 is secured to a carrier 33 connected with a transverse carrier 13.

With particular reference to FIGS. 4, 5, 6, and 7, the operation of the above-described article sensing and control arrangement will be set forth.

During normal conveyance (FIGS. 4 and 5) the articles 2 are oriented at a significant inclination causing the sensor arm 32 to be in a low position and thus the contacts 35 are closed by a switching member 34 of the sensor 6. This state causes the solenoid 5 to be energized whereby it attracts the armature 27 into its lower end position against a spring bias. As a result, the rail 4 is maintained in its lower end position where it is disengaged from the articles 2 so that the vibrating article support 3 is in an operative contact with the articles 2 and thus conveys the same.

If material accumulation occurs at the pusher slide 8 associated with one of the troughs 1 (FIGS. 6 and 7), the articles assume a more upright orientation in the channel 7 whereby they lift the sensor arm 32 causing an interruption of the electric connection between the contacts 35. This causes a de-energization of the solenoid 5 and as a result, the spring-loaded armature 27 lifts the rail 4 into its upper terminal position in which it projects beyond the vibrating article support 3 and thus overtakes support of the articles 2. The conveying effect of the vibrating conveyor trough 1 is thus interrupted.

Turning now to the variant construction shown in FIGS. 4, 5, 6 and 7, the vibratory article support 3 is formed of a beam 38, 39 of inverted U-shaped cross section, whose web or base 38 contains a central, elongated opening 40 oriented parallel to the article conveying direction. The legs 39 of the beam 38, 39 serve as reinforcement or stiffening so that the vibrating article support 3 may be a thin-walled and lightweight member. As a result, the vibrations transmitted to the frame 15 may be maintained very small. The rail 4 is connected with the pivotal levers 25 by webs 41.

The solenoid 5 may be controlled, in addition to or instead of the sensor 6, by other signals, for example, by a switch that responds to the operational state of the pusher slide 8, by a switch that responds to the conveying rate of a supply device arranged upstream of the conveyor troughs 1 or by a machine stop switch.

The embodiment illustrated in FIGS. 8–14 includes three vibratory troughs 1' having a semicircular cross section for conveying circular, flat items 2'. Each trough 1' is supported by two leaf springs 16 secured to the stationary machine frame 15. The leaf springs 16 are secured to the troughs 1' by means of support blocks 17. At the frontal support block 17 (as viewed in the direction of conveyance 9) there is attached a rod 20. The three rods 20 associated with the individual troughs 1' are driven by a common crankshaft 21 rotated by a motor 22. The crankshaft 21 is supported in plates 18 and 19 connected to the frame 15. At the discharge end, each trough 1' is adjoined by a stationary channel 7 which advances the items 2' to a pusher slide 8.

Each trough 1' has along its bottom an elongated rectangular opening 40', through which a stationary rail 4' projects into each trough 1'. Each rail 4' is connected by a respective pivotal lever 25' to an intermediate carrier 26 connected with the machine frame 15 and is settable by a screw 29 with a counternut 30 in its height relative to the trough 1'. At opposite longitudinal ends each rail 4' has a chamfered portion 28' to ensure smooth passage of the items over the rail ends.

The operation of the embodiment shown in FIG. 8, 9 and 10 will now be described with reference to FIGS. 11, 12, 13 and 14.

As long as the pusher slide 8 operates at a normal rate, the items 2' are inclined as illustrated in FIG. 12. In that inclined orientation the articles 2' are supported laterally solely by the article supports 3' of the vibrating troughs 1' and are thus conveyed in the conveying direction 9. If during article removal by the pusher slide 8 article accumulation occurs in one of the troughs, the items 2' are pushed closer together which automatically results in a more upright orientation thereof, as illustrated in FIG. 14. In this position, the articles are supported at the bottom solely by the rail 4', they are centered by the rail faces 31a, 31b arranged symmetrically to the longitudinal central plane 24 and are thus lifted off the vibratory support 3' whereby the vibrations of the trough 1' have no effect on the lifted articles. In this manner, the articles 2' are protected from breakage or from edge abrasions by the vibrating trough 1'.

It will be understood that the above description of the present invention is susceptible to various modifications, changes and adaptations, and the same are intended to be comprehended within the meaning and range of equivalents of the appended claims.

What is claimed is:

1. In a vibratory conveyor for advancing mutually contacting, stacked, wafer-like articles in an edgewise upstanding orientation, including a plurality of vibratory troughs arranged for supporting the articles; a common driving means connected to each vibratory trough for vibrating said vibratory troughs to effect an advance of the articles by vibratory effect in a conveying direction on the vibratory troughs along a length dimension thereof; each said vibratory trough having a width measured transversely to said conveying direction, the improvement wherein each said vibratory trough includes
   (a) an article-supporting vibratory base portion forming part of said vibratory trough; said vibratory base portion being elongated and extending parallel to the length dimension of said vibratory trough; said vibratory base portion having an elongated opening extending parallel to the length dimension thereof;
   (b) a non-vibratory, elongated rail-like member extending parallel to the length dimension of said vibratory trough and being situated in said elongated opening generally coextensively therewith; said non-vibratory rail-like member having a width measured parallel to the width of said vibratory trough; the width of said non-vibratory rail-like member being smaller than the width of said elongated opening; and
   (c) means for causing the articles to be disengaged, in response to an operational parameter, from said article-supporting vibratory base portion of said vibratory trough and for simulaneously causing the articles to be supported solely by said non-vibratory rail-like member, whereby conveyance of the articles is interrupted.

2. A vibratory conveyor as defined in claim 1, further comprising means for individually movably supporting said non-vibratory rail-like member of each said vibratory trough below said opening thereof; each said non-vibratory member having an inoperative position in which it is downwardly withdrawn relative to said vibratory base portion, whereby the articles are in engagement with said vibratory base portion and out of contact with said non-vibratory member; said non-vibratory member having an operative position in which it projects upwardly beyond said vibratory base portion, whereby the articles are in engagement with said non-vibratory member and out of contact with said vibratory base portion; and actuator means for individually moving said non-vibratory member of each of said vibratory trough into the inoperative and operative positions.

3. A vibratory conveyor as defined in claim 2, wherein said means for movably supporting said non-vibratory member of each said vibratory trough includes a lever held for pivotal motion in a substantially vertical plane.

4. A vibratory conveyor as defined in claim 2, further comprising a control means for controlling said actuator means as a function of the inclination of the upstanding orientation of said articles in a respective said vibratory trough.

5. A vibratory conveyor as defined in claim 4, said control means comprising individual sensor means for responding to predetermined inclinations of the articles in each said vibratory trough.

6. A vibratory conveyor as defined in claim 5, wherein each said sensor means comprises a sensor situated downstream of said non-vibratory member of each said vibratory trough as viewed in said conveying direction, and at a height level above the respective said vibratory trough for sensing upper edges of said articles.

7. A vibratory conveyor as defined in claim 6, further comprising a stationary article-guiding channel arranged end-to-end with each said vibratory trough downstream thereof for receiving articles therefrom; said sensor having a sensing zone situated above said stationary article-guiding channel.

8. A vibratory conveyor as defined in claim 1, further comprising means for stationarily supporting each said non-vibratory member; said non-vibratory projecting through said opening upwardly beyond said vibratory base portion; the vibratory base portion and the non-vibratory member being positionally coordinated with one another such that articles of predetermined peripheral shape are supported solely by said vibratory base portion in a relatively flat upstanding position of the articles and the articles are supported solely by said non-vibratory member in a relatively steep upstanding position of the articles.

9. A vibratory conveyor as defined in claim 8, further comprising height adjusting means for arbitrarily setting a height level of each said non-vibratory member relative to said vibratory base portion.

10. A vibratory conveyor as defined in claim 9, wherein said means for stationarily supporting each said non-vibratory member includes a lever held for pivotal motion in a substantially vertical plane for swinging motion during the setting of said height level by operating said height adjusting means.

11. A vibratory conveyor as defined in claim 8, wherein each said non-vibratory member has two article-supporting surfaces arranged symmetrically on both sides of an imaginary vertical plane passing centrally through each said vibratory trough and being parallel to the length dimension thereof.

12. A vibratory conveyor as defined in claim 8, wherein each said vibratory base portion forms an integral, one-piece part with the respective said vibratory trough.

13. A vibratory conveyor as defined in claim 12, wherein each said vibratory trough has a cross-sectionally semicircular configuration.

14. A vibratory conveyor as defined in claim 1, wherein said common driving means includes a common crankshaft operatively connected to each said vibratory trough; said common crankshaft including means for vibrating said vibratory troughs with a phase shift relative to one another.

15. A vibratory conveyor as defined in claim 14, further comprising means for movably supporting each said non-vibratory member below said opening; each said non-vibratory member having an inoperative position in which it is downwardly withdrawn relative to said vibratory base portion, whereby the articles are in engagement with said vibratory base portion and out of contact with said non-vibratory member; each said non-vibratory member having an operative position in which it projects upwardly beyond said vibratory base portion, whereby the articles are in engagement with said non-vibratory member and out of contact with said vibratory base portion; and separate actuator means for individually moving each said non-vibratory member into the inoperative and operative positions.

16. A vibratory conveyor as defined in claim 1, wherein each said non-vibratory member has, at opposite ends, downwardly sloping chamfered portions.

* * * * *